(12) United States Patent
Habib et al.

(10) Patent No.: US 7,995,494 B2
(45) Date of Patent: Aug. 9, 2011

(54) METHOD AND APPARATUS FOR CONDUCTING MEDIA QUALITY MEASUREMENTS AT A GATEWAY

(75) Inventors: Hussam Habib, Danville, CA (US); Zhi Li, San Ramon, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 139 days.

(21) Appl. No.: 12/420,691

(22) Filed: Apr. 8, 2009

(65) Prior Publication Data

US 2010/0260054 A1 Oct. 14, 2010

(51) Int. Cl.
*H04L 12/28* (2006.01)

(52) U.S. Cl. ........... 370/252; 370/390; 370/401; 725/96

(58) Field of Classification Search .......... 370/229–235, 370/252–253, 390, 400, 401; 725/91–98, 725/118, 119
See application file for complete search history.

(56) References Cited

U.S. PATENT DOCUMENTS

| | | | |
|---|---|---|---|
| 7,088,677 B1 * | 8/2006 | Burst, Jr. | 370/229 |
| 7,209,473 B1 | 4/2007 | Mohaban et al. | |
| 2002/0136162 A1 * | 9/2002 | Yoshimura et al. | 370/229 |
| 2006/0123456 A1 * | 6/2006 | Dei | 725/146 |
| 2007/0053303 A1 * | 3/2007 | Kryuchkov | 370/252 |
| 2007/0110043 A1 | 5/2007 | Girard | |
| 2007/0230361 A1 | 10/2007 | Choudhury | |
| 2008/0031151 A1 | 2/2008 | Williams | |

OTHER PUBLICATIONS

THOMASNET.COM, "Agilent Technologies' New Software Enables IPTV Service Quality Tests at the Residential Gateway", pp. 1-10, http://news.thomasnet.com/fullstory/535068, Web Site last visited Apr. 8, 2009.

* cited by examiner

*Primary Examiner* — Ricky Ngo
*Assistant Examiner* — Pao Sinkantarakorn
(74) *Attorney, Agent, or Firm* — Guntin Meles & Gust, PLC; Andrew Gust

(57) ABSTRACT

A system that incorporates teachings of the present disclosure may include, for example, a residential gateway (RG) having a controller to measure media presentation quality in a multicast network inline at the RG and to use Real-time Transport Protocol (RTP) header information from RTP packets to perform the media presentation quality measurements. Other embodiments are disclosed.

23 Claims, 4 Drawing Sheets

400

METHOD AND APPARATUS FOR CONDUCTING MEDIA QUALITY MEASUREMENTS AT A GATEWAY

FIELD OF THE DISCLOSURE

The present disclosure relates generally to video quality metrics and more specifically to a method and apparatus for conducting media quality measurements at a gateway.

BACKGROUND

Video quality in a multicast environment can be measured at the root of a multicast tree in a digital media network. This can be a natural point of aggregation where media streams may be observed. Measurements may also be taken at intermediate offices further downstream in order to include a greater portion of the data path. However existing measurements methods generally require the use of external equipment which can result in an increase in cost as the number of measurement points are deployed closer to a subscriber to monitor each subscriber's video receiving performance.

DETAILED DESCRIPTION

One embodiment of the present disclosure can entail a method at a residential gateway (RG) comprising measuring video quality in a multicast network inline at the RG wherein the information on the multicast network is encrypted and using Real-time Transport Protocol (RTP) header information from RTP packets to perform the video quality measurements.

Another embodiment of the present disclosure can entail a computer-readable storage medium at a server comprising computer instructions to poll an RG for media presentation quality measurements in a multicast network, wherein the measurements are taken inline at the RG and using RTP header information from RTP packets to make the media presentation quality measurements.

Yet another embodiment of the present disclosure can entail an RG having a controller to measure media presentation quality in a multicast network using RTP header information from RTP packets to perform the video quality measurements.

Yet another embodiment of the present disclosure can entail a server having a controller to poll an RG for media presentation quality measurements in an encrypted multicast network, wherein the measurements are taken inline at the RG and using RTP header information from RTP packets to make the media presentation quality measurements.

Figure 1:
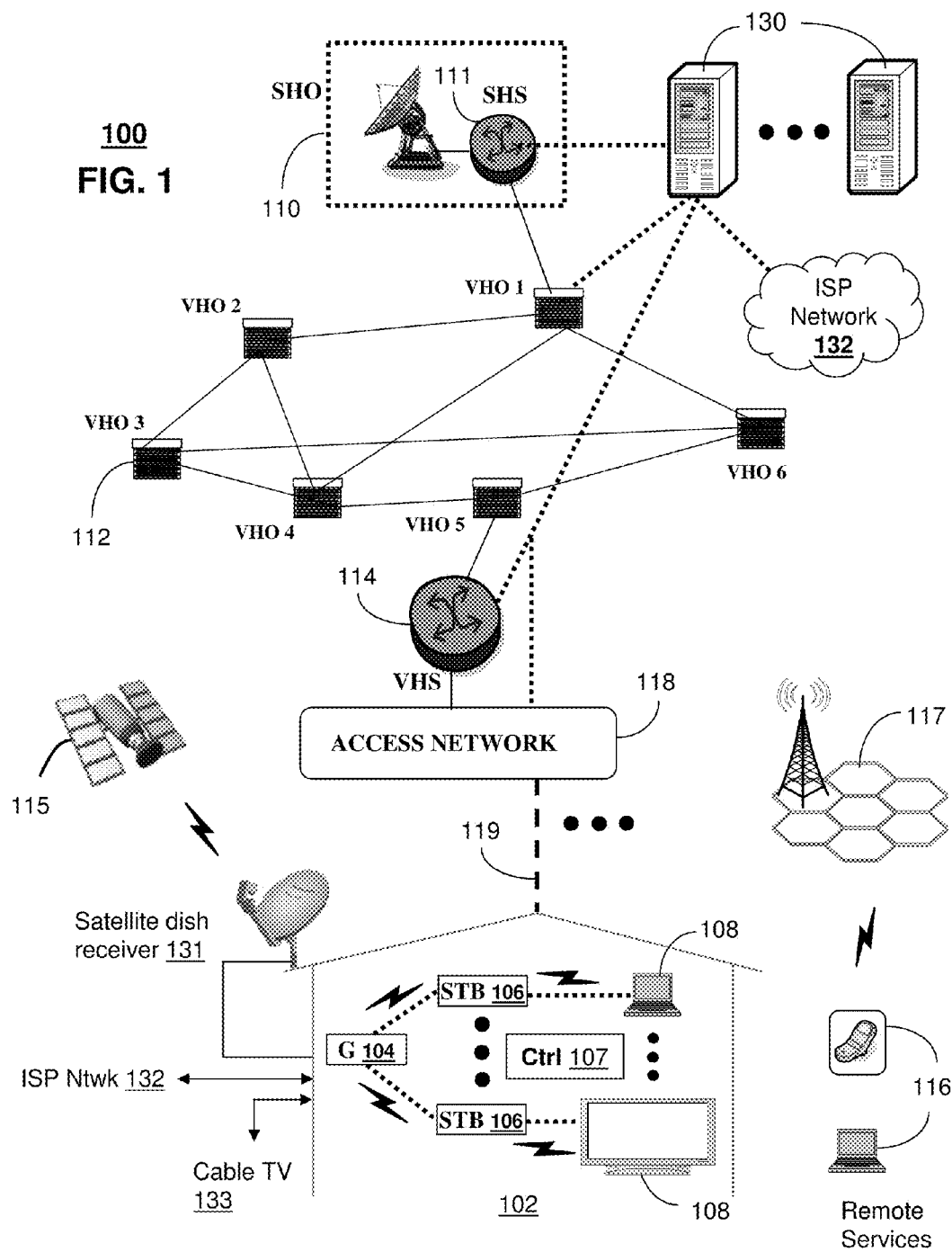
FIG. 1 depicts an illustrative embodiment of a communication system.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can function as a server (herein referred to as server 130). The server 130 can use common computing and communication technology to perform the function of adjusting between a video quality and an audio quality in a Interactive Television (iTV) or an IPTV presentation in response to a user selection where the audio quality and the video quality are adjusted at the expense of each other as will be further described with respect to FIG. 4.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
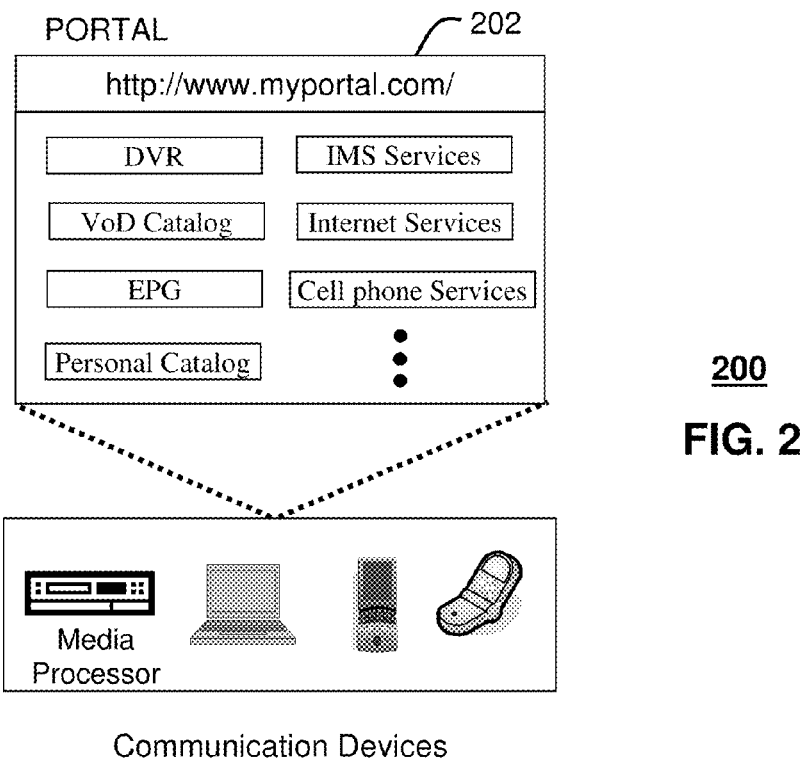
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. The portal 202 can be used for managing services of communication systems 100-200. The portal 202 can be accessed by a Uniform Resource Locator (URL) with a common Internet browser such as Microsoft's Internet Explorer™ using an Internet-capable communication device such as those described for FIGS. 1-2. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on. The portal 202 can also be used to allocate the relative quality settings for video quality and audio quality as further described herein. Note that the video and quality settings can also be set at the media processor or set top box in other embodiments. In yet other embodiments, the quality settings can be set at either the media processor or the portal (or server).

Figure 3:
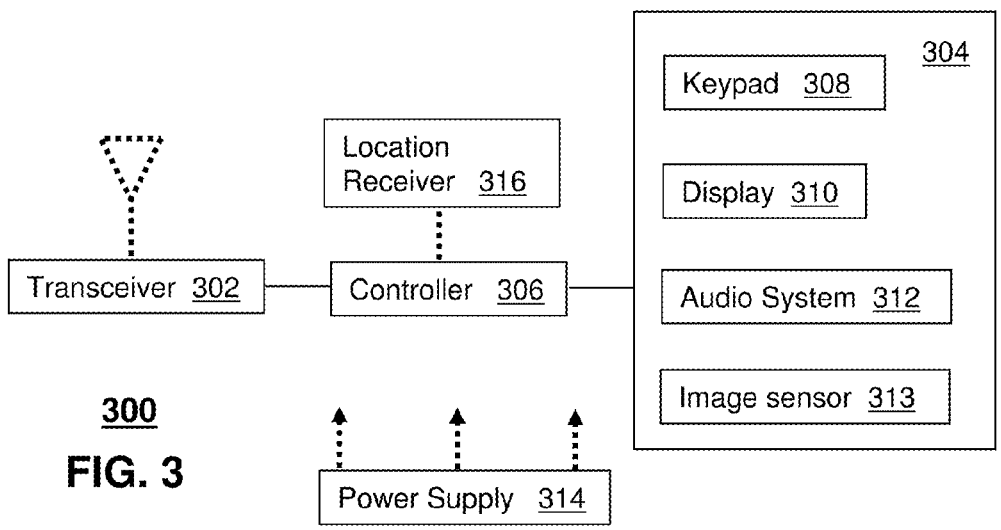
FIG. 3 depicts an illustrative embodiment of a communication device utilized in the communication system of FIG. 1.

FIG. 3 depicts an exemplary embodiment of a communication device 300. Communication 300 can serve in whole or in part as an illustrative embodiment of the communication devices of FIGS. 1-2. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alpha-numeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 412 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 56 of FIG. 1. It will be appreciated that the communication device 300 can also represent other common devices that can operate in communication systems 100 of FIG. 1 such as a gaming console and a media player.

Figure 4:
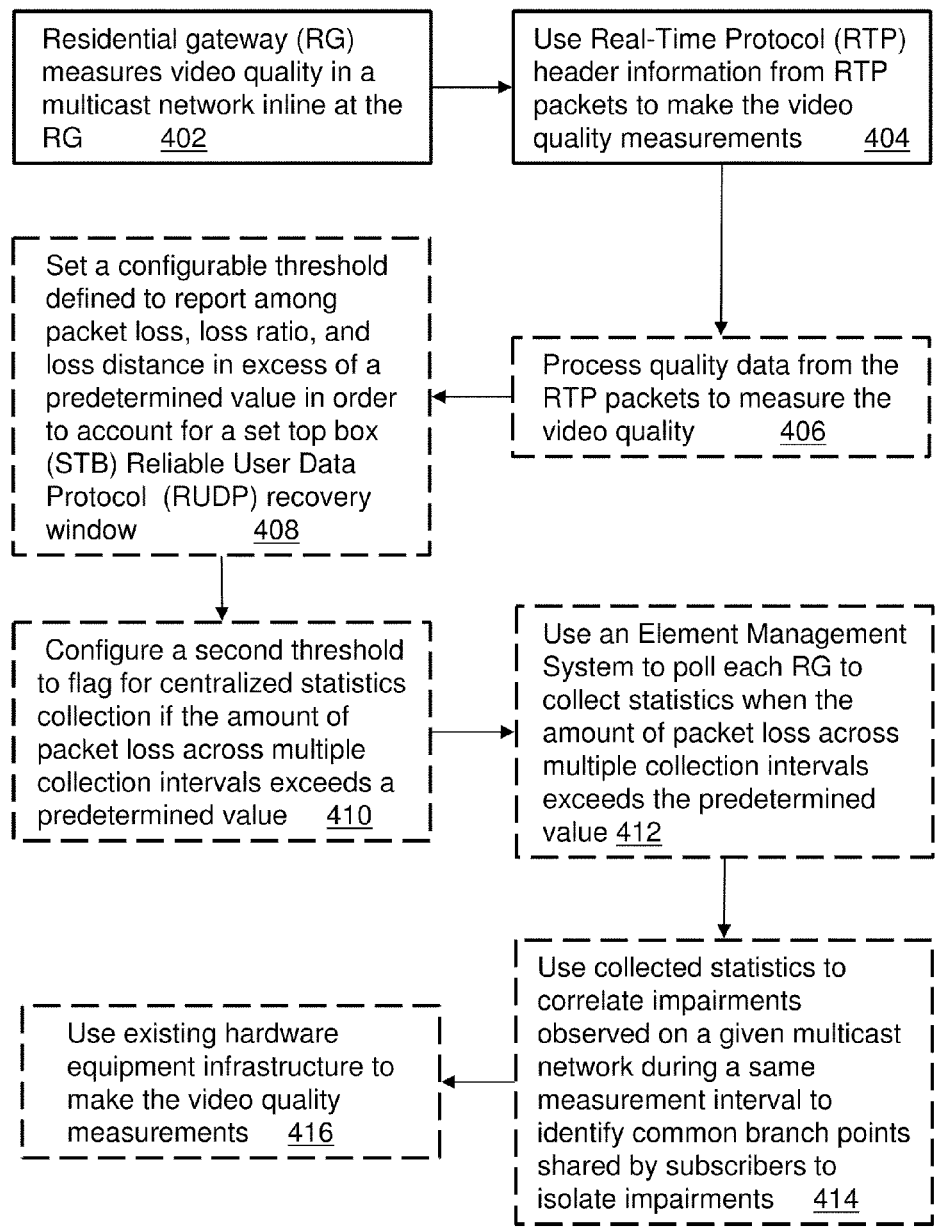
FIG. 4 depicts an illustrative embodiment of a method operating in portions of the communication system of FIG. 1.

FIG. 4 depicts an illustrative method 400 that operates in portions of the communication system of FIG. 1 such as at a residential gateway. Method 400 can begin with at 402 in which a residential gateway measures video quality in a multicast network inline at the RG where the information on the multicast network is encrypted and at 404 uses solely Real-time Transport Protocol (RTP) header information from RTP packets to make the video quality measurements. At 406, the method measures a least amount of meaningful data from the RTP packets to measure the video quality. The least amount of meaningful data can be collected from the RG by setting a configurable threshold at 408 defined to report among packet loss, loss ratio, and loss distance in excess of a predetermined value in order to account for a set top box (STB) Reliable User Data Protocol (RUDP) recovery window. In this regard, the RG only reports alarms or statistics back to a central server when the measurement exceeds the configurable threshold. A second threshold can be configured at 410 to flag for centralized statistics collection if the amount of packet loss across multiple collection intervals exceeds a predetermined value. An Element Management System at 412 can be used to poll each RG to collect statistics when the amount of packet loss across multiple collection intervals exceeds the predetermined value. At 414, the collected statistics can be used to correlate impairments observed on a given multicast network during a same measurement interval to identify common branch points shared by subscribers to isolate impairments. Note that the RG collects statistics for each multicast stream observed within each configurable measurement interval based on RTP sequence numbers and further note that the RG measures video quality in the multicast network inline solely using software. The RG monitors IPTV video delivery performance using the RTP header information for example, but in a similar fashion the RG can monitor voice delivery performance on an IPTV or iTV network. The method uses existing hardware equipment infrastructure to make the video quality measurements at 416.

Other suitable modifications can be applied to the present disclosure without departing from the scope of the claims below. Accordingly, the reader is directed to the claims section for a fuller understanding of the breadth and scope of the present disclosure. The embodiment generally contemplate a mechanism to monitor each subscriber's IPTV video or voice delivery performance by using RTP Header information measured at the subscriber's Residential Gateway (RG). Compared to existing approaches, this approach can efficiently monitor each subscriber's video or voice delivery performance with less overhead and less deployment cost. In addition, this mechanism can facilitate effective trouble-shooting.

Several issues affect measurement of video quality in an IP multicast environment that might not be as apparent in the context of other network environments. First, identification of the optimum measurement point is not as simple as one might think. In a multicast network, it is easiest to make a measurement at the root of the multicast tree. This is a natural point of aggregation and all streams may be observed at this point. Measurements may also be taken at intermediate offices further downstream in order to include a greater portion of the data path, however the problem which arises is that at each branch segment away from the multicast source the number of measurement points increases. Additionally, several existing measurement methods require the use of external equipment further adding to cost and inefficiency. The cost quickly increases as more measurement points are deployed closer to the subscriber to monitor each subscriber's video receiving performance. The second issue is to determine the type and quantity of data is necessary to assess IP quality used. Existing solutions (Ineoquest, Gigascope, and STB client diagnostics for example) collect a lot of data, including H.264, MPEG2-TS, RTP, RUDP, etc. However, after video streams are delivered out of a video Acquisition Server, video streams can only be impaired by IP delivery issues. Monitoring IP delivery performance is adequate to provide enough video performance indicators in this segment. (IP delivery segment). Further note that systems that monitor VOIP or CVOIP systems are inadequate since such systems are more tolerant to packet losses, whereas IPTV or multicast systems are not as tolerant to packet losses. Therefore, the quality measurement standards for IPTV streams, particularly encrypted streams are much higher.

Although several methods exist to determine video quality by making measurements at various points in a network by collecting different types of data at different points along the data path from content source to the subscriber using external monitoring equipment, the embodiments herein take a very different approach. Embodiments herein efficiently monitor on a per-subscriber level the IPTV video delivery performance. In so doing, such system would entail performance monitoring and making measurements at the RG (Residential Gateway). The RG sits in each subscriber's home and can enable the monitoring of each subscriber's video delivery performance. Measurements made at the RG eliminate the requirement for external measurement devices and contain the greatest segment excluding up to the STB. The embodiments second measure the least amount of meaningful data required to assess video quality. RTP packets contain sequence numbers which can be used to determine packet loss and a timestamp which may be used to determine delay variation (jitter). Thirdly, the RG can collect statistics for each multicast stream observed within each configurable measurement interval based on RTP sequence numbers. Based on above monitored least amount of information, the RG can have a complete picture of video receiving quality for each individual subscriber. The RG can report only statistics/alarms which exceed configured performance thresholds. For example, to measure packet loss a threshold may be defined to report packet loss, loss ratio, or loss distance in excess of a given value in order to account for the STB RUDP recovery window.

Various embodiments can are also contemplated with respect to the data collection aspects of the embodiments. To minimize the data collection overhead, monitored values may be stored for example in 96 15 minute collection intervals to start. These may be increased to 288 5 minute intervals depending on the RG's capability. These values may then be retained on the RG. Network operations may retrieve these statistics as necessary. Alternatively, in order to avoid overwhelming a centralized statistics collector, another threshold may be configured to flag these statistics for collection if the amount of packet loss across multiple collection intervals exceeds a given value. This information can be easily incorporated into existing EMS performance collection framework. The Element Management System may poll each RG and collect these statistics. Since this scope of the data-path is up to each subscriber, it is possible to then correlate impairments observed on a given multicast stream during the same measurement interval in order to identify common branch points shared by subscribers. In this manner, using recursive algorithms it is possible to isolate observed impairments to various points along the datapath.

Since IP video is delivered on top of IP multicasting, data correlation & root-cause analysis will take different forms from existing systems for root cause analysis. If two subscribers share the same upstream router/switch/DSLAM, they will receive the same multicasting streams when viewing the same channel. Based on this notion, if all the RGs connected to the same DSLAM report impairment at the same time based on the above measurement, most likely, the impairment happens at the DSLAM or further upstream (within multicast routing tree). Similarly, if all the downstream RGs connected to a switch report a performance issue at the same time, the impairment might happen at this switch or further upstream. Thus, by correlation the measurement reports from all the RGs can perform effective trouble isolation in a multicast network.

Figure 5:
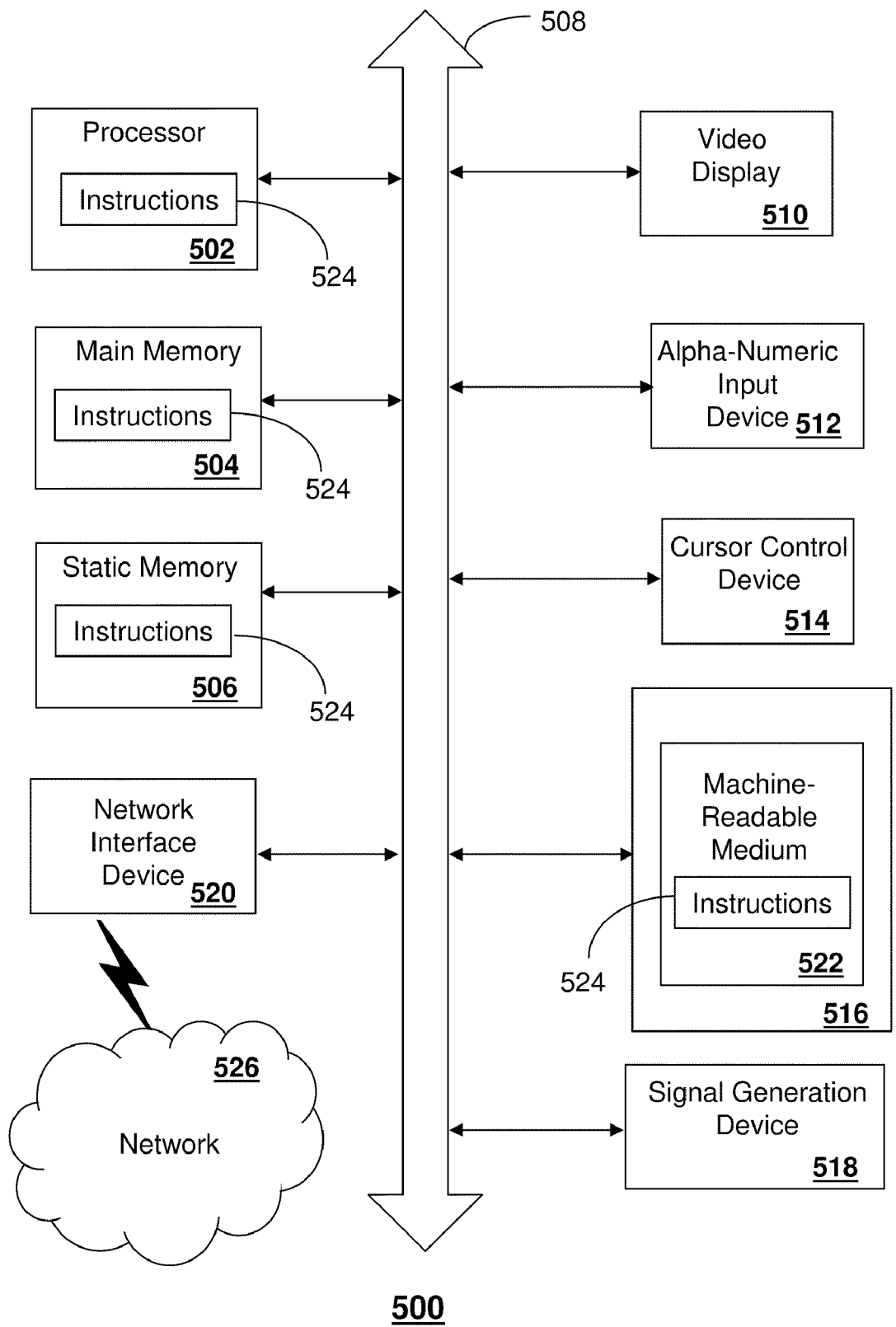
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   measuring video quality in a multicast network inline at a residential gateway, wherein the information on the multicast network is encrypted;
   processing quality data in Real-time Transport Protocol (RTP) packets to measure the video quality;
   using RTP header information from the RTP packets to perform the video quality measurements, wherein the quality data is collected from the residential gateway by setting a configurable threshold defined to report among packet loss, loss ratio, and loss distance in excess of a predetermined value in order to account for a set top box Reliable User Data Protocol recovery window;
   reporting back to a central server when the measurement exceeds the configurable threshold; and
   setting a second threshold configured to flag for centralized statistics collection when the amount of packet loss across multiple collection intervals exceeds a predetermined value.

2. The method of claim 1, comprising obtaining at least a portion of the quality data in pre-determined collection intervals.

3. The method of claim 2, wherein the pre-determined collection intervals are based on performance parameters of the residential gateway.

4. The method of claim 1, wherein the reporting comprises statistics.

5. The method of claim 1, wherein the reporting comprises alarms.

6. The method of claim 1, comprising using an Element Management System to poll each residential gateway to collect statistics when the amount of packet loss across multiple collection intervals exceeds the predetermined value.

7. The method of claim 1, comprising observing collected statistics to correlate impairments observed on a given multicast network during a same measurement interval to identify common branch points shared by subscribers to isolate impairments.

8. The method of claim 1, comprising collecting statistics for each multicast stream observed within each configurable measurement interval based on RTP sequence numbers.

9. The method of claim 1, comprising measuring video quality in the multicast network inline using software.

10. The method of claim 1, comprising monitoring Internet Protocol Television video delivery performance using the RTP header information.

11. The method of claim 1, comprising using existing hardware equipment infrastructure to make the video quality measurements.

12. A non-transitory computer-readable storage medium, comprising computer instructions to:
   poll a residential gateway for media presentation quality measurements in a multicast network, wherein the measurements are taken inline at the residential gateway; and
   using Real-time Transport Protocol (RTP) header information from RTP packets to perform the media presentation quality measurements, wherein the residential gateway performs measurements on the RTP packets to measure the media presentation quality by setting a configurable threshold defined to report among packet loss, loss ratio, and loss distance in excess of a predetermined value in order to account for a set top box Reliable User Data Protocol recovery window, wherein the residential gateway reports when the measurement exceeds the configurable threshold, wherein a second threshold configured to flag for centralized statistics collection is set to collect statistics when the amount of packet loss across multiple collection intervals exceeds a predetermined value.

13. The non-transitory computer-readable storage medium of claim 12, wherein media information transported in the multicast network is encrypted.

14. The non-transitory computer-readable storage medium of claim 12, wherein the reports comprise alarms.

15. The non-transitory computer-readable storage medium of claim 12, wherein the reports comprise statistics.

16. The non-transitory computer-readable storage medium of claim 12, comprising computer instructions to utilize an Element Management System to poll each RG to collect statistics when the amount of packet loss across multiple collection intervals exceeds the predetermined value.

17. The non-transitory computer-readable storage medium of claim 12, comprising computer instructions to monitor collected statistics to correlate impairments observed on a given multicast network during a same measurement interval to identify common branch points shared by subscribers to isolate impairments.

18. A residential gateway, comprising a controller to measure media presentation quality in a multicast network using Real-time Transport Protocol (RTP) header information from RTP packets to perform the media presentation quality measurements, wherein the controller is operable to measure the media presentation quality from RTP packets by setting a configurable threshold defined to report among packet loss, loss ratio, and loss distance in excess of a predetermined value in order to account for a set top box Reliable User Data Protocol recovery window, wherein the controller reports when the measurement exceeds the configurable threshold, and wherein a second threshold configured to flag for centralized statistics collection is set and triggered when the amount of packet loss across multiple collection intervals exceeds a predetermined value.

19. The residential gateway of claim 18, wherein media information transported in the multicast network is encrypted.

20. The residential gateway of claim 18, wherein media information transported by the multicast network corresponds to audio content, still image content, moving image content, and combinations thereof, wherein the multicast network corresponds to an interactive television network, and wherein the interactive television network corresponds to at least one of an Internet Protocol Television network, an interactive cable TV network, a satellite TV network, and an IP Multimedia Subsystem network.

21. The residential gateway of claim 18, wherein the reports comprise alarms.

22. The residential gateway of claim 18, wherein the reports comprise statistics.

23. The residential gateway of claim 18, wherein the controller is operable to monitor at least one of video and audio delivery performance using the RTP header information.

* * * * *